M. H. HAINES.
VENTILATOR.
APPLICATION FILED JULY 2, 1909.
997,806.
Patented July 11, 1911.
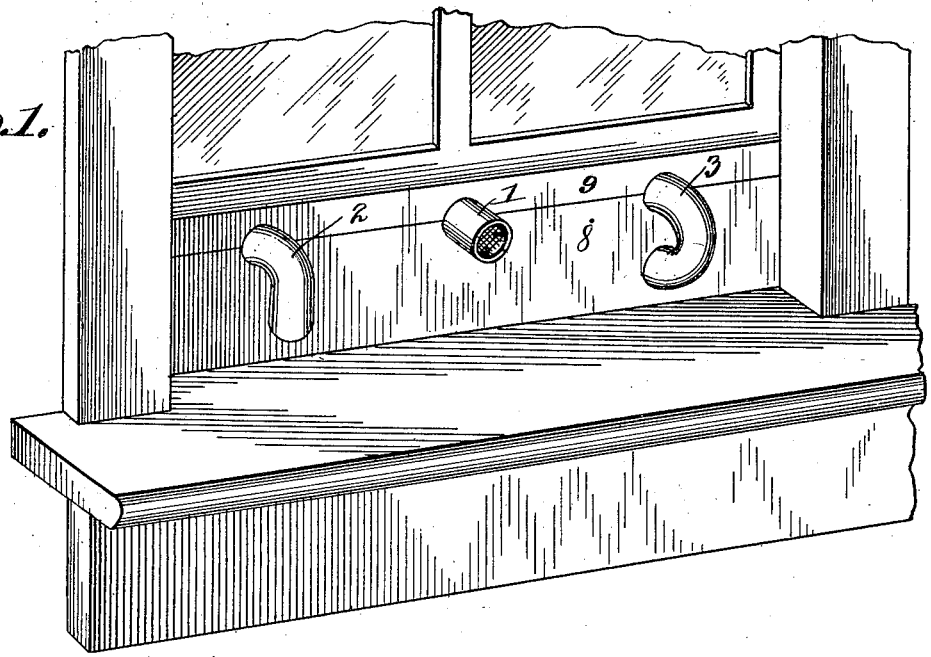
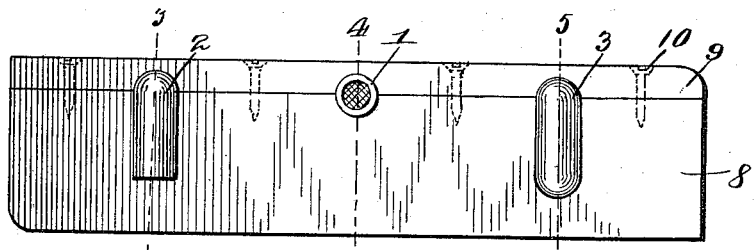
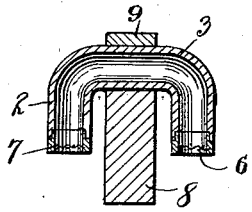 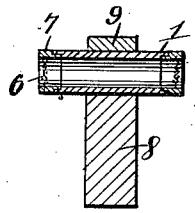 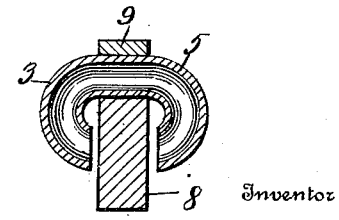
Witnesses
William C. Linton.
U. B. Hillyard.
Inventor
Martin Henry Haines.
By Victor J. Evans
Attorney
COLUMBIA PLANOGRAPH CO., WASHINGTON, D. C.

UNITED STATES PATENT OFFICE.

MARTIN H. HAINES, OF ROSSITER, PENNSYLVANIA.

VENTILATOR.

997,806.  Specification of Letters Patent.  Patented July 11, 1911.

Application filed July 2, 1909. Serial No. 505,621.

*To all whom it may concern:*

Be it known that I, MARTIN H. HAINES, a citizen of the United States, residing at Rossiter, in the county of Indiana and State of Pennsylvania, have invented new and useful Improvements in Ventilators, of which the following is a specification.

The present invention provides novel means for ventilating buildings, vessels, public carriers such as closed vehicles and other structures requiring vitiated air to be replaced by pure air both for respiratory purposes and also to prevent deterioration of products that may be stored or placed in the building or structure required to be ventilated.

The invention contemplates the provision of means which will admit of both direct and indirect currents of air, said means comprising tubes which are protected to prevent insects and small animals passing therethrough into the structure to be supplied with pure and fresh air.

The invention consists of the novel features, details of construction and combinations of parts which hereinafter will be more particularly set forth, illustrated in the accompanying drawings and pointed out in the appended claims.

Referring to the drawings forming a part of the specifications: Figure 1 is a perspective view of the lower portion of a window provided with ventilating means embodying the invention. Fig. 2 is a front view of one form of the ventilator. Fig. 3 is a sectional view on the line 3—3 of Fig. 2. Fig. 4 is a cross section on the line 4—4 of Fig. 2. Fig. 5 is a transverse section on the line 5—5 of Fig. 2.

Corresponding and like parts are referred to in the following description and indicated in all the views of the drawings by the same reference characters.

In accordance with this invention, a tube is provided and arranged so as to establish communication between the open air and the interior of the structure to be ventilated. This tube may be straight or deflected between its ends into any desired shape and the passage therethrough is protected so as to exclude the passage of insects and small animals therethrough. It is proposed to locate the ventilating tubes in the most advantageous position and to employ either straight or bent tubes according as direct or indirect air currents are to be obtained.

The ventilating tube may be straight as indicated at 1 in Figs. 1, 2 and 4 or it may be of substantially U-form as indicated at 2 in Figs. 1, 2 and 3 or the end portions of the tube may be recurved as indicated at 3 in Figs. 1, 2 and 5. Where the ends of the ventilating tube are exposed as indicated most clearly in Figs. 3 and 4 they are protected by wire gauze 6 the same being secured to cap pieces 7 which are fitted to the ends of the tube in any manner. Where the ends of the ventilating tube are recurved as indicated most clearly in Fig. 5 they may terminate a short distance from the support and by reason of the recurving of the ends the chances for insects or small animals to enter the tube and pass therethrough are very remote. The ventilating tubes may be of any size and one or more different styles may be applied to the same structure according to the results to be attained at any particular point.

It is to be observed that the straight tubes insure a direct draft whereas the provision of tubes deflected between their ends results in the formation of indirect currents and thereby insures proper ventilation without subjecting the structure to direct air currents which may be objectionable under certain conditions.

The ventilating tubes are preferably applied to a support 8 which may consist of a strip of board, said support having notches in one edge to form seats in which the ventilating tubes are fitted. A cap piece 9 is notched opposite the notches of the strip or support 8 so as to provide spaces for reception of the ventilating tubes. The cap piece 9 is secured to the support 8 by means of screws or fastenings 10. The matching notches in the cap piece 9 and strip 8 are of a size a trifle smaller than the diameter of the ventilating tubes to admit of the latter being clamped and held firmly in place by tightening the fastenings 10.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what is claimed is—

In ventilating means, a support, and a ventilating tube held in the support at a middle point and having its end portions extending beyond opposite sides of the support and bent laterally and recurved toward the support and terminating a short distance from the support.

In testimony whereof I affix my signature in presence of two witnesses.

MARTIN H. HAINES.

Witnesses:
 ISAAC L. SMITH,
 E. S. SWARTZ.

Copies of this patent may be obtained for five cents each, by addressing the "Commissioner of Patents, Washington, D. C."